(No Model.)  3 Sheets—Sheet 1.

C. UNGER.
VEGETABLE BOILER AND CUTTER.

No. 314,084. Patented Mar. 17, 1885.

WITNESSES:

INVENTOR
Charles Unger
By
Connolly Brooth° ...
ATTORNEYS (No Model.) 3 Sheets—Sheet 2.

C. UNGER.
VEGETABLE BOILER AND CUTTER.

No. 314,084. Patented Mar. 17, 1885.

WITNESSES:
N. N. Connolly
J. B. Connolly

INVENTOR
Chas. Unger
By Connolly Bros & McTighe
ATTORNEYS

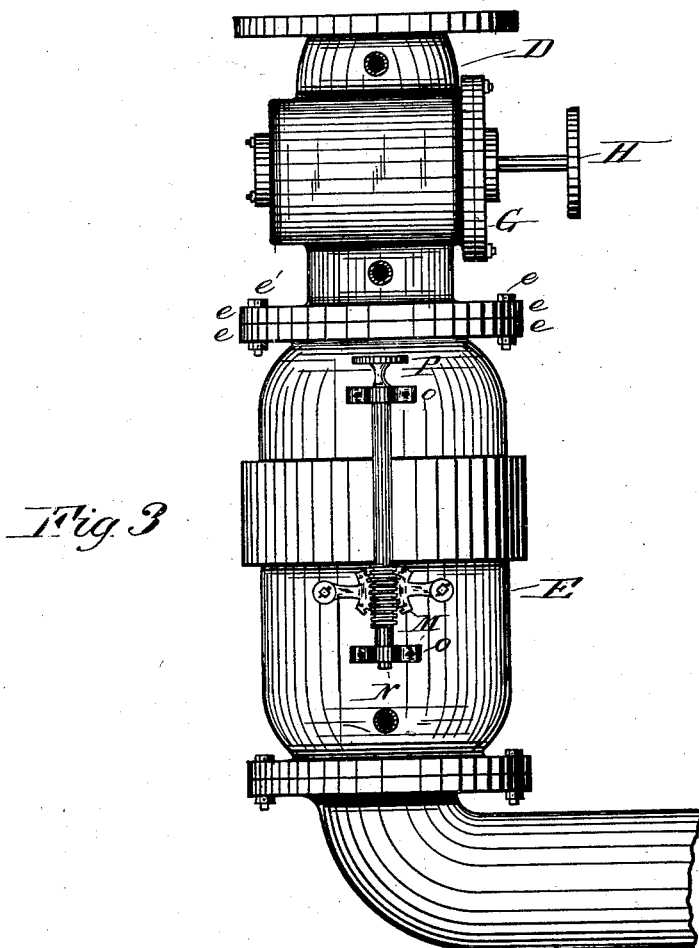

UNITED STATES PATENT OFFICE.

CHARLES UNGER, OF PITTSBURG, PENNSYLVANIA, ASSIGNOR OF TWO THIRDS TO ELIAS KAUFFELD AND THOMAS MILLER.

VEGETABLE BOILER AND CUTTER.

SPECIFICATION forming part of Letters Patent No. 314,084, dated March 17, 1885.

Application filed December 27, 1884. (No model.)

*To all whom it may concern:*

Be it known that I, CHARLES UNGER, of Pittsburg, in the county of Allegheny and State of Pennsylvania, have invented certain new and useful Improvements in Vegetable Boilers and Cutters; and I do hereby declare that the following is a full, clear, and exact description of the invention, which will enable others skilled in the art to which it appertains to make and use the same, reference being had to the accompanying drawings, which form a part of this specification, in which—

Figure 1:
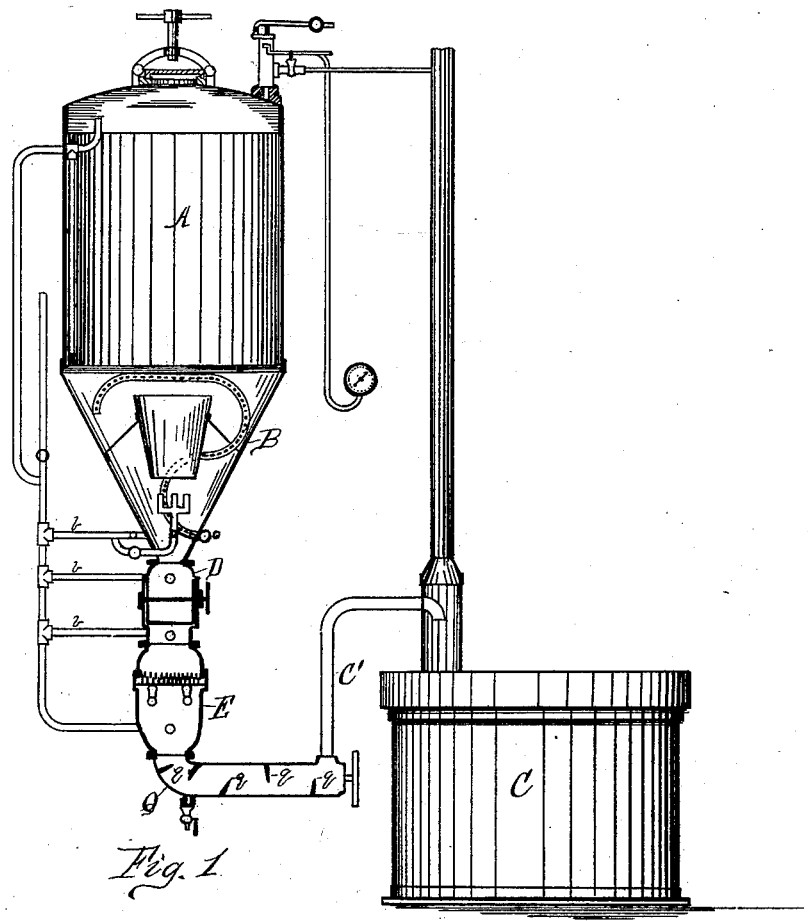
Figure 2:
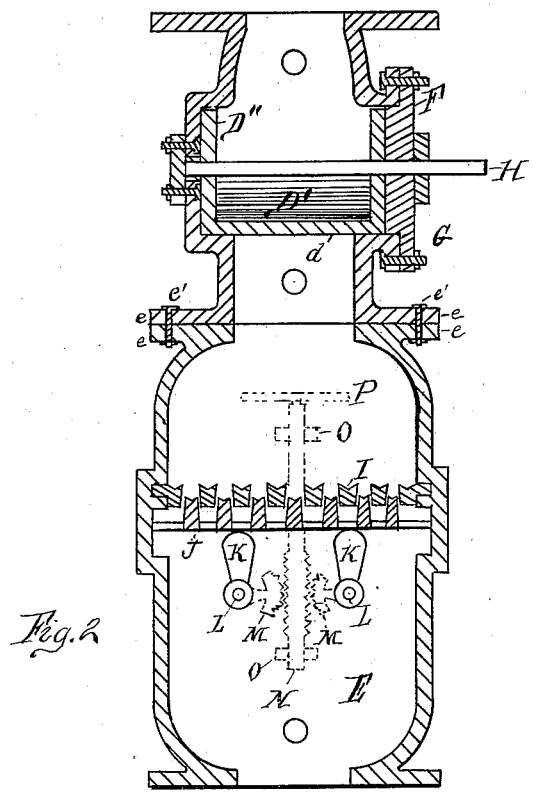
Figure 4:
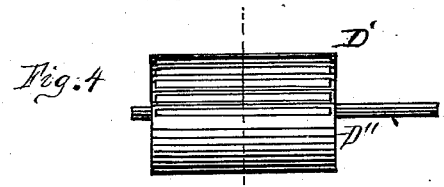
Figure 5:
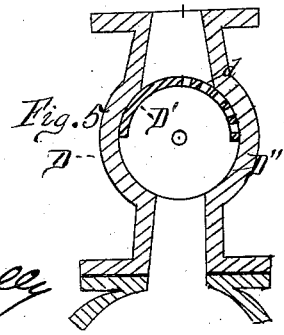

Figure 1 is a side elevation, partly in section, of the apparatus. Fig. 2 is a sectional view of the crushing apparatus. Fig. 3 is a side elevation of the same. Fig. 4 represents details of the strainer. Fig. 5 is a sectional view of the chamber D and the valve D' in position therein.

My invention relates to vegetable boilers and cutters for use in distilleries; and it has for its object the provision of means whereby the vegetables submitted to the action of the crushing or cutting apparatus will be more perfectly reduced to a pulpy condition.

My invention consists in the novel combination and arrangement of parts hereinafter more fully described and claimed.

Referring to the accompanying drawings, A designates the boiler ordinarily employed in preparing the vegetables for the crushing apparatus.

B designates the funnel-shaped bottom of said boiler opening into the crushing apparatus and provided with the several steam-pipes $b\ b\ b$, arranged in the usual manner and communicating, as shown, with the boiler at top and bottom and with the crushing apparatus at the points $b'\ b'\ b'$.

The crushing apparatus, which is attached to the bottom of the boiler A and communicates with a mash-tub C by means of a pipe, C', consists of two chambers, D and E, the former containing an adjustable grating, by means of which the vegetable matter coming from the boiler A is strained of impurities, and the latter two sets of vertically-reciprocating knives or cutters, which, working in conjunction, serve to crush and grind the material and reduce it to the desired pulpy condition. Referring to Figs. 2, 4, 5 of the drawings, it will be seen that the grating above referred to consists of a semi-cylindrical plate, D', one side of which is formed with slots $d$, extending completely across the face of said plate. Said plate is formed integral with or attached to two disks, D'', one at each end, forming a valve. The chamber D is of a cylindrical shape at its middle portion, and the plate D' and heads D'' fit snugly within such portion, being introduced through an opening, F, at one side, which is closed by a head, G, secured to the chamber D by means of bolts and lugs, as shown.

A shaft, H, passes through the head G, the disks D'', and the side of the chamber D, and to said shaft the disks D'' are keyed or otherwise securely fastened, so that upon turning the shaft the plate D' will be moved around, so as to allow the vegetable matter to pass through the slots $d$ to entirely cut off the passage of the same, as desired.

When necessary, the grating may be removed from the chamber D by taking off the head G.

The chamber D communicates with the boiler A above and with the chamber E below, flanges $e\ e$ and bolts $e'\ e'$ serving to secure the chambers D and E together. Within the latter is fixed a series of horizontal cutters or knives, I, and beneath said cutters is a second set of cutters, J, which register with and work in the spaces between the cutters I, this latter set of cutters being adapted to be moved vertically through the medium of cams K K, mounted on rock-shafts L L, journaled in the sides of the chamber E.

Upon the outer ends of the rock-shafts L are attached two toothed sectors, M M, which gear with an upright bar, N, having a rack, $n$, on each side.

The bar N is attached to the outside of the chamber E by means of brackets O O, in which it is free to work vertically, a handle, P, being secured to its top.

To the bottom of the chamber E is attached a large pipe, Q, within which are arranged a number of partitions, $q\ q$, which serve to further reduce the material passing therethrough, and the pipe Q communicates with the mash-tub by the pipe C'.

The operation of my apparatus is as follows: The vegetable matter being introduced into the boiler A, steam is turned on and the material is digested and boiled to the desired extent. The shaft H is now turned, so that the material can pass down through the slots $d$ and fall upon the knives I. The knives J are now vertically reciprocated by working the handle P up and down, and the crushed material falls down into the pipe Q, where it is further reduced by the partition $q\,q\,q$, against which it is forced by the pressure of the steam from the boiler, and finally passes off to the mash-tub C through pipe C'.

In Letters Patent issued to me on the 8th day of April, 1884, and numbered 296,651, I have described a means for operating the vertically-cutting knives, consisting of a crank and arm; and I do not, therefore, herein, broadly, claim vertically cutting and stationary knives for the purpose of cutting the vegetables, but I have restricted my claims to the cutters and appliances for working the same, as specifically shown and described in this application.

What I claim as new is—

1. The combination, with chamber D and boiler A, of the movable semi-cylindrical plate D', having the slots $d$ at one side the disks D", secured to the shaft H, substantially as described.

2. The combination, with the stationary knives I, the movable knives J, cams K, beneath said knives, of the rock-shafts L, the toothed sectors M M, secured to said shaft, and the toothed bar N, gearing with said sectors, substantially as described.

3. In an apparatus for preparing vegetable matter for mashing, the combination of the boiler A, chambers D and E, the former being provided with the revolving grating D' and the latter with the reciprocating knives or cutters J and the stationary knives I, and means, substantially as described, for operating said knives and grating, with the pipe Q, having partitions $q\,q$, all arranged and operated as set forth.

In testimony that I claim the foregoing as my own I have hereto affixed my signature in presence of two witnesses.

CHARLES UNGER.

Witnesses:
C. L. STRAUB,
ALIA A. MOORE.